Patented Mar. 8, 1938

2,110,775

UNITED STATES PATENT OFFICE 2,110,775

INHIBITION OF VARNISH SKINNING

Joseph Rivkin, Pittsburgh, Pa., assignor to The Neville Company, a corporation of Pennsylvania No Drawing. Application March 15, 1937, Serial No. 130,869

6 Claims. (Cl. 134—26)

This invention relates to the inhibition of skinning in oleoresinous varnishes and varnish enamels. In accordance with the specific character of varnishes and enamels of this general type, I am able by the means hereinafter described substantially to retard or wholly to inhibit skinning of the varnish.

Further, by the same instrumentality which inhibits skinning, I cure the gas-checking phenomenon potentially present in coating compositions which contain any substantial quantity of China-wood, or "tung," oil.

In a polymerization conducted in crude solvent naphtha, or like liquids containing the same polymerizable reactives and which will be herein considered to be "crude solvent naphtha," two separable products of polymerization are formed. One is hard coumarone resin and the other is a heavy, oily, fluid substance consisting chiefly of the dimers of coumarone, indene, dicyclopentadiene, and the like polymerizable reactives. This heavy, oily fluid is known alternatively as "heavy" oil, or "dipolymer" oil. If, during the progress of polymerization, a phenolic substance is involved, the result is to produce a heavy, oily fluid analogous to heavy oil, but possessing distinctive characteristics distinguishing it from the normal, or characteristically coumarone type, heavy oil This distinctive substance I designate "phenolic heavy oil."

Methods of producing this phenolic heavy oil are disclosed in my co-pending applications Serial No. 53,514, filed December 9, 1935; Serial No. 55,613, filed December 21, 1935; and Serial No. 89,847, filed July 9, 1936. It may also be obtained by practicing the method disclosed in German patent to Ruetgerswerke Aktiengesellschaft No. 302,543, of 1919, and recovering the heavy, oily fluid produced in that process. To define the substance more specifically, it may be described as a reaction product produced by phenolic involvement in a polymerization of the polymerizable reactives of crude solvent naphtha. A striking characteristic of the phenolic heavy oil is its ability when warmed to dissolve cellulose acetate. When hard resin is produced in the same operation, as is preferred practice, that hard resin possesses the characteristic of solubility in alcohol.

I have made the discovery that this phenolic heavy oil has the ability to inhibit, either in the sense of retardation or in the sense of a positive inhibition, the skinning tendency normally exhibited by oleoresinous varnishes and varnish enamels, and have discovered that it may with advantage be incorporated in oleoresinous base coating compositions as an inhibitor of their skinning tendency. The effect of the phenolic heavy oil as included in oleoresinous varnishes to inhibit skinning is more marked in the case of those varnishes of that type which do not normally present an extreme skinning tendency. Its presence does, however, serve substantially to retard skinning in any oleoresinous varnish.

A heavy oil which is the product of a straight polymerization of the crude solvent naphtha polymerizables has no inhibiting effect upon skinning in oleoresinous varnishes. Phenolic heavy oil which has to a noticeable degree a phenolic involvement in the bodies corresponding generally to the lower polymers comprised in common heavy oil, to a notable degree serves as a skinning inhibitor in the oleoresinous varnishes. It is undesirable to include the phenolic heavy oil in a weight substantially exceeding 3% of the total volume of a varnish, because of the retardation to drying which a "heavy" oil, phenolic or unmodified, imparts to the film-forming content. I find it desirable, therefore, to use as a skinning inhibitor in varnishes a phenolic heavy oil in which the phenolic involvement is proportionately great, in order that a high inhibiting effect for the skinning tendency of the varnish may be obtained without unduly retarding the drying of the varnish film. Capacity, when warmed, to dissolve cellulose acetate may be taken as an index of a high stage of phenolic involvement in the heavy oil.

The following examples are illustrative of the skinning inhibition introduced into several samples of oleoresinous varnish by the addition of phenolic heavy oil thereto:

Example No. 1

Phenol-formaldehyde resin (unmodified), 100 lbs.
Tung oil, 50 gals.
Evaporative solvent, 65 gals.
Metallic drier.

This varnish, when allowed to stand in a half-filled, capped container, skinned in 2.5 hours. Upon addition of 1% its volume of the phenolic heavy oil to a sample which was identically tested for skinning tendency, the sample was free from skinning for 4.5 hours.

Example No 2

Ester gum, 100 lbs.
Tung oil, 35 gals.
Evaporative solvent, 50 gals.
Metallic drier.

This varnish, when allowed to stand in a half-filled, capped container, skinned in 20 hours. Upon addition of 1% its volume of the phenolic heavy oil to a sample identically tested, the same sample showed no skinning tendency for 6 days. In 9 days it had skinned over its entire surface.

*Example No. 3*

Coumarone resin, 100 lbs.
Tung oil, 28 gals.—Linseed oil, 5 gals.
Evaporative solvent, 50 gals.
Metallic drier.

This varnish, when allowed to stand in a half-filled, capped container, skinned in 16 hours. Upon addition of 1% its volume of the phenol-modified heavy oil to a sample identically tested, the sample showed no signs of skinning upon standing for 9 days.

In the foregoing formulae the phenolic heavy oil is of a sort which is capable, when it is warmed, of dissolving cellulose acetate, and may therefore be considered as an example of a heavy oil in relatively high state of phenolic involvement. The kinds of driers and the percentages of the driers on the basis of the drying oils used are not given, because outside of the fact that most oleoresinous varnishes make use of lead, cobalt, and manganese in the form of either oxide or salt, there is considerable variation in the percentages of the drier metals employed, depending not only on the type of resin employed in the varnish, but also on the particular resin within any given type. Thus, two different 100% phenolic resins used in two varnishes of the same general formula may require different percentages and relative proportions of drier metals. The same is true for two different grades of modified phenolic resin.

As is well known, tung oil possesses a tendency to "gas-check" or "frost." The use of certain resins with tung oil serves to correct that tendency. Certain other resins, such as coumarone resin, possess, however, no ability to inhibit "gas-checking" or "frosting" when included with tung oil in an oleo-resinous varnish. The "gas-checking" or "frosting" of a tung oil varnish film is of frequent occurrence when a film of the varnish is allowed to dry under certain conditions, as in an atmosphere containing combustion fumes. This tendency is considered to be an undesirable characteristic of tung oil varnishes. In the three examples given above, films of varnish in accordance with Examples No. 1 and No. 2 (without phenolic heavy oil) had no gas-checking tendency, due to the effect of either the resin included in the varnish or the formulation and mode of cooking the varnish. A varnish film in accordance with Example No. 3 (without phenolic heavy oil) showed a definite tendency to "gas-check."

I have further discovered that, when included in tung oil varnishes which are not otherwise protected against "gas-check," phenolic heavy oil serves positively to inhibit that tendency. Thus a film deposited from a varnish in accordance with Example No. 3, but with the addition of 1% its volume of phenolic heavy oil, showed no tendency to "gas-check" under severe "gas-checking" conditions. Whether the varnish contain a resin ineffective to inhibit "gas-check," or whether it be a simple tung oil varnish, an addition of phenolic heavy oil in a weight less than 3% the volume of the total varnish composition is adequate wholly to prevent "gas-check," it being assumed that the phenolic heavy oil is a product of substantial phenolic involvement.

In instances where a very slow-drying film is permissible, phenolic heavy oil may be added in substantially more than a 3% proportion. It is, however, as noted above, a matter of general desirability to restrict the heavy oil content of a varnish to an approximate 3% content.

I claim as my invention:

1. The combination with an oleoresinous varnish which possesses an inherent skinning tendency, of the heavy, oily fluid termed herein "phenolic heavy oil" and which is a product of polymerization, with concurrent phenolic involvement, of the polymerizable bodies of crude solvent naphtha in the presence of a phenolic substance, said fluid being present in the varnish in a relatively small amount sufficient to repress said skinning tendency.

2. The combination with an oleoresinous varnish which possesses an inherent skinning tendency, of not substantially more than about 3 per cent by the volume of the varnish of the heavy, oily fluid termed herein "phenolic heavy oil" which when warmed is capable of dissolving cellulose acetate and which is a product of polymerization, with concurrent phenolic involvement, of the polymerizable bodies of crude solvent naphtha in the presence of a phenolic substance, said fluid repressing said skinning tendency.

3. The combination with an oleoresinous varnish containing coumarone resin and possessing an inherent skinning tendency, of the heavy, oily fluid termed herein "phenolic heavy oil" and which is a product of polymerization, with concurrent phenolic involvement, of the polymerizable bodies of crude solvent naphtha in the presence of a phenolic substance, said fluid being present in the varnish in a relatively small amount sufficient to repress said skinning tendency.

4. The combination with an oleoresinous varnish containing tung oil and which possesses an inherent tendency towards skinning and gas-checking, of the heavy, oily fluid termed herein "phenolic heavy oil," and which is a product of polymerization, with concurrent phenolic involvement, of the polymerizable bodies of crude solvent naphtha in the presence of a phenolic substance, said fluid being present in the varnish in a relatively small amount sufficient to repress said skinning tendency and to inhibit said gas-checking.

5. The combination with an oleoresinous varnish containing tung oil and which possesses an inherent tendency toward skinning and gas-checking, of not substantially more than about 3 per cent by volume of the varnish of the heavy, oily fluid termed herein "phenolic heavy oil" and which is a product of polymerization, with concurrent phenolic involvement, of the polymerizable bodies of crude solvent naphtha in the presence of a phenolic substance, said fluid repressing said skinning tendency and inhibiting said gas-checking.

6. The combination with an oleoresinous varnish containing coumarone resin and tung oil and which possesses an inherent tendency toward skinning and gas-checking, of not substantially in excess of about 3 per cent by volume of the varnish of the heavy, oily fluid termed herein "phenolic heavy oil" and which is a product of polymerization, with concurrent phenolic involvement, of the polymerizable bodies of crude solvent naphtha in the presence of a phenolic substance, said fluid repressing said skinning tendency and inhibiting gas-checking.

JOSEPH RIVKIN.